July 13, 1965  G. GRECO  3,194,264
GAS MIXER APPARATUS
Original Filed Sept. 26, 1955
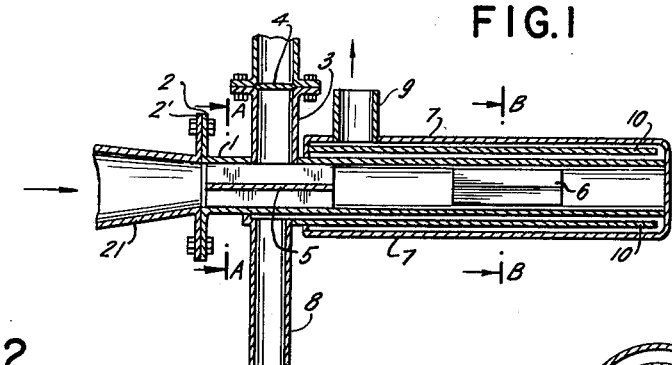
FIG.1
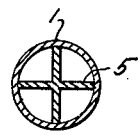
FIG.2
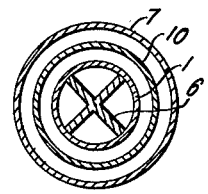
FIG. 2'
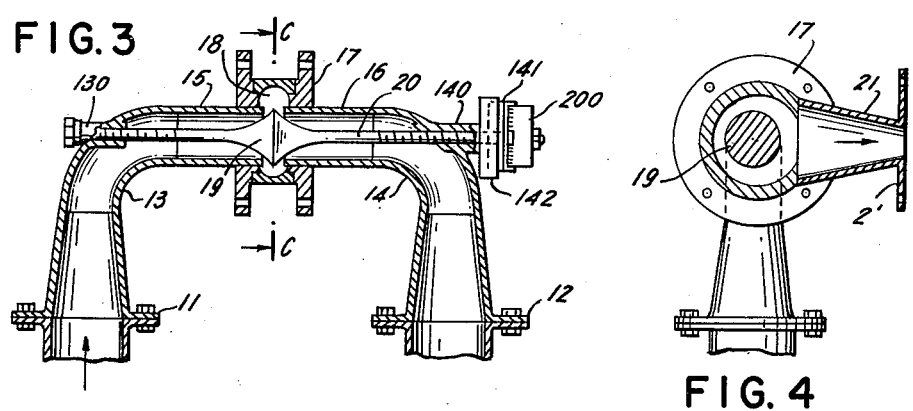
FIG.3
FIG. 4
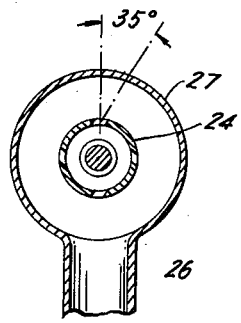
FIG. 6
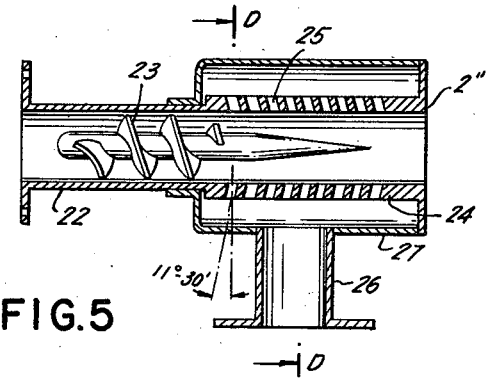
FIG.5

United States Patent Office 3,194,264
Patented July 13, 1965

3,194,264
GAS MIXER APPARATUS
Guido Greco, Milan, Italy, assignor to Montecatini, Società Generale per l'Industria Minèraria e Chimica, Milan, Italy, an Italian corporation
Application Sept. 26, 1956, Ser. No. 612,184, now Patent No. 3,052,288, dated Sept. 4, 1962, which is a division of application Ser. No. 536,510, Sept. 26, 1955, now Patent No. 2,859,103, dated Nov. 4, 1958. Divided and this application Feb. 23, 1962, Ser. No. 175,240
Claims priority, application Italy, Sept. 28, 1954,
Patent 525,183
2 Claims. (Cl. 137—556)

This application is a division of patent application Serial Number 612,184 filed September 26, 1956, now Patent No. 3,052,288 granted September 4, 1962, which is in turn a division of Serial Number 536,510, filed September 26, 1955, now Patent No. 2,859,103 granted November 4, 1958.

The present invention relates to the production of synthesis gas, that is, carbon monoxide and hydrogen, by means of the partial combustion of methane, or other gaseous aliphatic hydrocarbons, with oxygen in the absence of catalysts, being particularly directed to devices for carrying out this process.

In his Italian Patent No. 446,318 the applicant has described a process for the production of synthesis gas from gaseous aliphatic hydrocarbons and oxygen. In a first stage of that process the two gases are reacted with each other in form of a swirling mixture and thereafter, in a second stage, the gas mixture is further reacted by means of the heat set free in the first reaction stage and in the presence of known catalysts. For this purpose, the hydrocarbon gas and the oxygen are introduced into the combustion chamber by means of nozzles. This manner of introduction, which produces a strong swirling motion of the gases, and the arrangement of the first stage reaction chamber adjacent to a catalysis chamber provided for the second stage of the reaction, permits the use of practically pure and undiluted hydrocarbons and oxygen in contrast to previously described processes of this type. Moreover, the process avoids the formation of undesirable gas black. It was the formation of gas black and the incomplete conversion of methane which, until the said invention, caused the failure of every attempt to employ practically (95–100%) pure hydrocarbons, without the addition of any inert gases or steam in carrying out the process illustrated by the following known equations.

First stage (exothermic):

(I)    $2CH_4 + O_2 = 2CO + 4H_2$
(II)   $CH_4 + 2O_2 = CO_2 + 2H_2O$

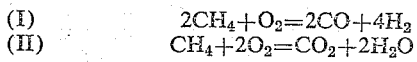
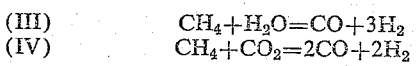

Second stage (endothermic, supported by the heat liberated in first stage):

(III)  $CH_4 + H_2O = CO + 3H_2$
(IV)   $CH_4 + CO_2 = 2CO + 2H_2$

It is the principal object of this invention to improve upon the foregoing process by furnishing a method of operation which, aside from avoiding the formation of gas black and reducing the amount of methane in the final gaseous reaction mixture to a minimum, represents a substantial improvement in (a) eliminating the use of catalysts, (b) demanding substantially little reactor space, (c) not requiring the supply of outside heat and (d) requiring unexpectedly low reaction temperatures (about 900° C.) while using 95–100% pure hydrocarbon, without the addition of any inert gas or steam.

It is another object of the invention to furnish devices by which the improved process of producing synthesis gas may be carried out.

The invention will best be understood from the following description of several preferred embodiments of the herein claimed devices taken in conjunction with the accompanying drawings, in which:

FIG. 1 is a schematic sectional view of a burner (outlet tube),

FIGS. 2 and 2' are cross-sectional views on the lines AA and BB, respectively, in FIG. 1, FIG. 3 is a schematic sectional view of one embodiment of a pre-mixer of the present invention, FIG. 4 is a cross-sectional view on the line CC in FIG. 3, FIG. 5 is a schematic sectional view of another embodiment of a pre-mixer of the present invention, and FIG. 6 is a cross-sectional view on the line DD in FIG. 5.

In the process carried out in accordance with the present invention a very complete pre-mixing of the reaction gases, such as $CH_4$ and $O_2$, is executed outside the reaction chamber. This is attained by impacting the respective gas streams upon each other. For this purpose the effective components of the kinetic energies of the two gases, or expressed differently, the aliquots of the kinetic energies of the gas flow rates relating to the opposite direction components of the velocities of the two reacting gases, should be equal, and preferably of the order of 100–200 kgm./Nm.$^3$ of $CH_4$ (Nm.$^3$ representing one cubic meter of gas at 20° C. and 1 atm. pressure). Corresponding values for other gaseous hydrocarbons than methane may be readily established by means of the formula 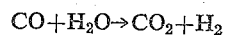 $e = mv.^2/2$. The burners according to the present invention are particularly adapted for this principle of operation. The construction of these burners permits the before-mentioned intimate mixing of the two reaction gases. If operated at atmospheric pressure, the load losses in conjunction with these burners are very low, being of the order of 500 kg./m.$^2$.

The gaseous mixture obtained by means of the herein disclosed process consists of $H_2$, CO, $CO_2$, $H_2O$ and about 0.2% by volume of residual $CH_4$. It has a $H_2$/CO ratio of about 2 and a $CO_2$ content of the order of 1% by volume. In view of this composition, and the absence of any gas black, the gaseous mixture can be used directly and without any after-treatment in a second reactor for the manufacture of methanol or of products of the Fischer-Tropsch synthesis.

On the other hand, a second reactor is always a necessity where carbon monoxide must be further reacted in order to produce hydrogen according to the formula $$CO + H_2O \rightarrow CO_2 + H_2$$

when the gas mixture is to be employed in the synthesis of ammonia.

As previously mentioned, the possibility of a partial combustion, at a temperature not above 1000° C. and preferably of about 900° C., of practically pure (95–100%) gaseous hydrocarbons, with oxygen, in the absence of any catalyst and inert gas or steam, and of obtaining thereby a gaseous mixture consisting primarily of CO and $H_2$, including only about 0.2% by volume of $CH_4$ and without the formation of gas black constitutes a substantial improvement over prior art, including applicant's prior process disclosed in said Italian patent.

The two reacting gases are pre-mixed and introduced into the oven or reactor by means of one or by several burners, each consisting of a pre-mixer and an outlet tube. According to this invention, the necessary intimate pre-mixing is predicated upon the force of impact and the respective directions of the two gas streams, which must be such as to insure a high level of that component of the velocity which is essential for the impact and the mutual penetration of the two gas streams. Moreover, two extremely thin streams must be produced in order to attain a microscopically uniform composition of the mixed gas stream entering into the burner.

The herein disclosed novel conception has been confirmed by subsequent experiments which prove that the factors determining the efficiency of mixing are the value of the tangential component of the energy of the two flows, the rotational energy and the time of residence of the mixture in the burner. Exceeding certain energy limits, the second factor prevails over the first. By means of these experiments it has been confirmed that, with burners applying the above-mentioned principle of premixing and with kinetic energy components of an effectiveness as previously set forth, the desired results are readily obtained.

Referring now in detail to the drawings, the pre-mixers illustrated in FIGS. 3 and 5 are meant to be applied to the burner or outflow tube of FIG. 1. This burner consists substantially of the outflow tube 1 itself, applied by means of a flange 2, to the corresponding flange 2' or 2" of the pre-mixer shown in FIG. 4 or that of FIG. 5, respectively. From the pre-mixer the hydrocarbon, for example methane-oxygen mixture, enters the outflow tube in the direction of the arrow. Near the front section, which is fastened to the pre-mixer, tube 1 is provided with a branch pipe 3 having a safety outlet 4. By means of a partition 5, the front section of the tube is subdivided into several longitudinal outflow chambers, as shown, for example, in the cross-sectional view of FIG. 2. The rear section of tube 1 is subdivided in a similar manner by means of a partition 6. However, as indicated in FIG. 2', the walls of this partition are angularly offset, at 45°, for example with respect to the walls of partition 5. Tube 1 is cooled by means of a double-wall water jacket 7, having an inlet 8 and an outlet 9 for the cooling water, whereby the walls of the jacket are arranged so as to cause the cooling water to circulate in opposite directions along the two faces of interior wall 10 of the jacket.

The swirling gases pass from the mixing device of FIG. 3, or that of FIG. 5, to the tube 1. Tube 1 was termed an outflow tube, above. It is attached by the outlet of the mixing device, and provides the outflow passage for the gas mixture into the combustion chamber. Tube 1 has an outlet at 100, the gases passing therefrom into the combustion chamber or oven or reactor, a wall of which is indicated at 101. As stated above, the two reacting gases are pre-mixed and introduced into the oven or reactor by means of one or several burners, each consisting of a pre-mixer, i.e. that of FIG. 3 or FIG. 5, and an outlet tube for the pre-mixer.

FIG. 3 shows a mixer into which the reaction gases, for example O₂ and CH₄ enter through two flared ports 11 and 12 respectively. By means of connecting elbow pieces 13 and 14 these ports are joined with tubes 15 and 16 which are in axial alignment and are held at their free extremities by a mixing chamber. The latter comprises a cylindrical section which is provided with sleeves 17 and an annular hollow member 18 and contains an axially displaceable double-coned obturator or proportioning valve 19, preferably made of stainless steel. As shown, this valve is controlled by a spindle 20, which is provided with a thumbscrew 200 having a scale for varying the size of the inlet openings for oxygen and the hydrocarbon and for indicating the ratio between these openings. Spindle 20 is screw-threadedly mounted for rotation in studs 130 and 140 fixed upon elements 13 and 14 respectively. An indicator sleeve 141 is carried in flange member 142, which is fixed upon stud 140. By means of this valve, the velocity, stream size and impact angle of the two gas streams are readily controlled. Thus the effective components of the kinetic energy of the gas streams, as specified above, can be easily regulated. The double-cone 19 deviates, or deflects, the two gas jets of oxygen and methane, for example coming from the two oppositely aligned ducts 11, 13, 15 and 12, 14, 16 respectively, into the single peripheral annular recess 18. From the latter, the mixed gases pass through conduit 21 into the outflow tube 1 of the burner illustrated in FIG. 1. The shape of double coned member 19 makes the gas streams meet with velocities having substantial and oppositely directed axial components. In this way the desired mixing is achieved.

Another embodiment of the pre-mixer is shown in FIGS. 5 and 6. This mixer comprises an inlet tube 22 for the gas to be burned. Fitted into this tube is a helical core 23, preferably of stainless steel, to impart to the incoming gas stream a helicoidal rotation with a substantially high velocity in the tangential plane. Attached to tube 22 is an extension 24 of relatively heavy material provided with a pattern of borings spaced radially about and longitudinally along the circumferences of the extension. As shown, these borings are drilled at oblique angles through the wall of this extension. Oxygen, entering through lateral tube 26 into the jacket 27, is blown through these borings so that the tangential components of the velocities of the two gases are directed oppositely to each other, whereby the oppositely rotary flow of the two gases is gradually damped. Obviously, this type of mixer also permits a simple control of the velocity, the stream size and the impact angle of the two gases; these are the factors previously mentioned as essential to this invention. From the pre-mixer, the gases enter the outflow tube 1 (FIG. 1) substantially without any turbulence, which is important in order to produce a regular and undisturbed flame at the end of the outflow tube and to avoid backfiring.

Experimental mixers of the described above types have been operated at velocities ranging from 20 to 120 m./sec. (type shown in FIG. 3) and from 15 to 100 m./sec. (type shown in FIG. 5). The load losses encountered thereby were found to be 475 kg./m.².

As a typical example, the following operative and constructional data are given: For a flow rate of 300 Nm.³/hour of CH₄, it suffices if a pre-mixer of the type illustrated in FIG. 3 has a flow cross-sectional area for the two gases of about 0.0015 m.². By shifting the position of obturator valve 19, the ratio between the cross-sectional areas of the flow of CH₄ and O₂ is varied, but the sum of these two cross-sectional areas always remains constant. The angle at the base of the double cone is, for example, 55°. In case of a pre-mixer of the type illustrated in FIG. 5, the volume of the mixing chamber between the first and last row of borings 25 may vary from 900 to 1750 cc.; the borings may have, for example, a diameter of 4 to 5 mm. each and their number may vary from 40 to 80. The residence time of the gases in the burner is preferably of the order of 0.012 sec. The flow rates may be so adjusted that, for example, an oxygen flow rate of about 230 Nm.³/hour corresponds with a methane flow rate of 300 Nm.³/hour. As a rule, the ratio of O₂ to CH₄ should be adjusted at between 0.5 and 0.8.

When the O₂ to CH₄ ratio is 0.72, a ratio at which no carbon black is formed, the stoichiometric equation of the process may be summarized as follows:

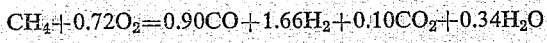

$$CH_4 + 0.72O_2 = 0.90CO + 1.66H_2 + 0.10CO_2 + 0.34H_2O$$

In this reaction summary the small amounts of residual methane which, as previously mentioned, are present in an amount of the order of 9.2% by volume, based on dry gas, are disregarded. Under these conditions, the amount of water vapors formed in the gaseous mixture is equal to about 10% by volume. The amount of water vapors tends to decrease when a O₂/CH₄ ratio lower than 9.72 is employed.

The afore-described process, carried out at atmospheric pressure, can be readily adapted for operation at higher pressure, for example, at the pressure at which natural gas is available, resulting in a substantial reduction of the energy requirements for the synthesis of ammonia and methanol.

I claim:

1. A gas mixer which comprises means providing a chamber, means in the mixer forming separate inlets for two gases to the chamber, a double-coned valve member in said chamber having a stem portion and two opposed joined gas deflecting and spreading surfaces, each of said opposed surfaces flaring outwardly in a smooth and continuous curve from said stem portion to the outermost diameter of said valve member, said chamber having opposite ends communicating with said inlets extending toward each other from the ends, the chamber being enlarged between said ends and provided with opposed valve seats at each end of the enlargement, the enlarged portion of the valve at the outermost diameter of the valve extending into the enlarged portion of the chamber so that each of the opposed surfaces may engage alternatively with a valve seat, the walls of said chamber being shaped to direct the two gases coaxially toward each other so as to impinge on said respective surfaces and so that the impinging of the gases on said surfaces causes intimate mixing, said valve member being mounted for longitudinal movement toward one valve seat and away from the other at any one time for proportioning the relative amounts of said two gases, said chamber having an outlet communicating with the juncture of said two surfaces for conducting out the gas mixture formed.

2. A gas mixer comprising a center section providing a chamber, two gas inlet pipes mounted to form a U with said center section, an axially displaceable valve comprising a double-coned proportioning valve body mounted in said center section, said valve body having a stem portion and two opposed joined surfaces, each of said opposed surfaces flaring outwardly in a smooth and continuous curve from said stem portion to the outermost diameter of said valve body, an enlarged portion of the chamber connecting the ends of the inlet pipes, a valve seat at each of the ends in the chamber, the enlarged portion of the valve stem at the outermost diameter extending into the enlarged portion of the chamber so that each of the opposed surfaces may engage alternatively with a valve seat, said valve body being disposed in said inlet pipes for impinging of said gases on said surfaces in respective zones coaxial with said valve body, a spindle supporting said valve body and disposed longitudinally of and within the base of the U, means on said mixer for turning said spindle to vary the relative sizes of intake openings at the double cone for said gases entering through respective inlet pipes and for indicating the ratio between the said openings, the walls of said chamber being shaped to direct the two gases coaxially toward each other so as to impinge on said respective surfaces and so that the impinging of the gases on said surfaces causes intimate mixing, and a gas conduit communicating with the juncture of said surfaces and extending perpendicularly from said center position.

References Cited by the Examiner

UNITED STATES PATENTS

| | | | |
|---|---|---|---|
| 828,086 | 8/06 | Bowers | 137—625.4 |
| 1,480,146 | 1/24 | Bradshaw | 48—180 |
| 1,490,884 | 4/24 | Spreen | 137—625.4 |
| 2,252,501 | 8/41 | Foresman | 137—604 |
| 2,742,922 | 4/56 | Frellsen | 137—625.69 |
| 2,838,066 | 6/58 | Harris | 137—556 |

FOREIGN PATENTS

| | | |
|---|---|---|
| 115,513 | 7/42 | Australia. |
| 580,774 | 9/46 | Great Britain. |

M. CARY NELSON, *Primary Examiner.*

MAURICE A. BRINDISI, *Examiner.*